(12) United States Patent
Lalla

(10) Patent No.: US 6,940,292 B2
(45) Date of Patent: Sep. 6, 2005

(54) CIRCUIT CONFIGURATION FOR A CAPACITIVE SENSOR

(75) Inventor: Robert Lalla, Lörrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/483,412

(22) PCT Filed: Jul. 18, 2002

(86) PCT No.: PCT/EP02/07974

§ 371 (c)(1),
(2), (4) Date: Nov. 1, 2004

(87) PCT Pub. No.: WO03/010495

PCT Pub. Date: Feb. 6, 2003

(65) Prior Publication Data

US 2005/0077909 A1 Apr. 14, 2005

(30) Foreign Application Priority Data

Jul. 20, 2001 (DE) .......................... 101 34 680

(51) Int. Cl.$^7$ .............................................. G01R 27/26
(52) U.S. Cl. ...................................... 324/661; 324/679
(58) Field of Search ............................ 73/724; 324/658, 324/661, 678, 679

(56) References Cited

U.S. PATENT DOCUMENTS 5,235,267 A * 8/1993 Schoneberg et al. ....... 324/71.5
5,451,940 A * 9/1995 Schneider et al. ..... 340/870.37
6,316,948 B1 * 11/2001 Briefer ........................ 324/678

* cited by examiner

Primary Examiner—Anjan Deb
Assistant Examiner—Walter Benson
(74) Attorney, Agent, or Firm—Bacon & Thomas

(57) ABSTRACT

The circuit configuration includes a measuring capacitor having a variable capacitance, which is set by means of a physical measured quantity to be detected, a reference capacitor and a buffer amplifier. An input of the buffer amplifier is at least temporarily coupled to the measuring capacitor such that an output of the buffer amplifier supplies a signal voltage essentially proportional to a measurement voltage occurring on the measuring capacitor. At the beginning of each measuring cycle, the measuring capacitor is discharged to a predetermined residual charge, whereas the reference capacitor is charged to a predetermined reference charge. Afterwards, the reference charge is transferred as completely as possible from the reference capacitor to the measuring capacitor. To this end, the input and output of the buffer amplifier are temporarily coupled to one another via the first reference capacitor during operation. The circuit configuration thus supplies a signal voltage dependent on a reciprocal of the capacitance of the measuring capacitor and, in addition, has a current consumption that is practically independent of the instantaneous capacitance of the measuring capacitor.

16 Claims, 4 Drawing Sheets

CIRCUIT CONFIGURATION FOR A CAPACITIVE SENSOR

FIELD OF THE INVENTION

The invention relates to a circuit arrangement for a capacitive sensor, as well as to a method for setting a signal voltage instantaneously representing a variable, physical, measured quantity, especially a static pressure of a fluid.

BACKGROUND OF THE INVENTION

In EP-A 922 962, a circuit configuration for a capacitive sensor is disclosed, which includes:
- a measuring capacitor having a variable capacitance, which is set by means of a physical, measured quantity to be detected, which measuring capacitor carries a charge proportional to the instantaneously set capacitance,
- a discharging reference capacitor and
- an inverting amplifier
- of which an input and an output are connected together via the reference capacitor,
- wherein the input of the amplifier is temporarily coupled with the measuring capacitor such
- that the charge of the measuring capacitor is transferred as completely as possible onto the reference capacitor and
- that the output of the amplifier supplies a signal voltage which is essentially proportional to the capacitance of the measuring capacitor.

It has been found to be disadvantageous with such a circuit configuration, among other things, that the charge applied to the measuring capacitor is dependent on its instantaneous capacitance and, consequently, current consumption of the circuit configuration can fluctuate in use over a wide range. The current consumption can reach undesirably high values therein, especially also for the not inconceivable case of a short circuit within the measuring capacitor.

An additional disadvantage of the mentioned circuit configuration arises in its application in a capacitive pressure sensor where the yielded signal voltage is proportional to the capacitance and, consequently, not proportional to the measured quantity being detected.

SUMMARY OF THE INVENTION

An object of the invention is, consequently, to provide a circuit configuration which is especially suited for a capacitive sensor, exhibits a current consumption which is practically independent of the instantaneous capacitance of the measuring capacitor, and produces a signal voltage dependent on the reciprocal of the capacitance of the measuring capacitor.

For solving the object, the invention provides, for a capacitive sensor, a circuit configuration, which includes:
- a first measuring capacitor discharged to a predeterminable residual charge and having a variable capacitance set by means of a physical, measured quantity to be detected,
- a first reference capacitor carrying a reference charge, and
- a first buffer amplifier
- of which an input is coupled at least temporarily with the first measuring capacitor such that
- an output of the first buffer amplifier delivers a first signal voltage, which is essentially proportional to a measured voltage occurring on the first measuring capacitor,
- wherein input and output of the first buffer amplifier are coupled during operation temporarily together via the first reference capacitor such that the reference charge of the first reference capacitor is transferred as completely as possible onto the first measuring capacitor.

The invention additionally resides in a method for setting a signal voltage, which instantaneously represents a variable, physical, measured quantity, especially a static pressure of a fluid, which method includes the following steps:
- causing a change in the capacity of an adjustable measuring capacitor, such change corresponding with a change in the measured quantity;
- discharging the measuring capacitor to a predetermined residual charge,
- producing a reference charge on a reference capacitor,
- transferring the reference charge from the reference capacitor onto the measuring capacitor for producing a measurement voltage instantaneously representing its capacity, and
- amplifying the measurement voltage with an amplification of about one for producing the signal voltage.

According to a fifth preferred development of the invention, the circuit configuration includes for transferring the reference charge onto the first measuring capacitor a third switch temporarily coupling the second electrode of the first reference capacitor to the input of the first buffer amplifier.

According to a sixth preferred development of the invention, the circuit configuration includes a sample-hold circuit for sampling and holding the signal voltage.

BRIEF DESCRIPTION OF THE DRAWINGS

The invention and advantages are explained below in more detail on the basis of examples of embodiments presented in the figures of the drawing; equal parts are provided in the figures with equal reference characters. In cases where it serves for clarity, repetition of already presented reference characters is avoided in subsequent figures.

DESCRIPTION OF THE PREFERRED EMBODIMENTS

Figure 1:
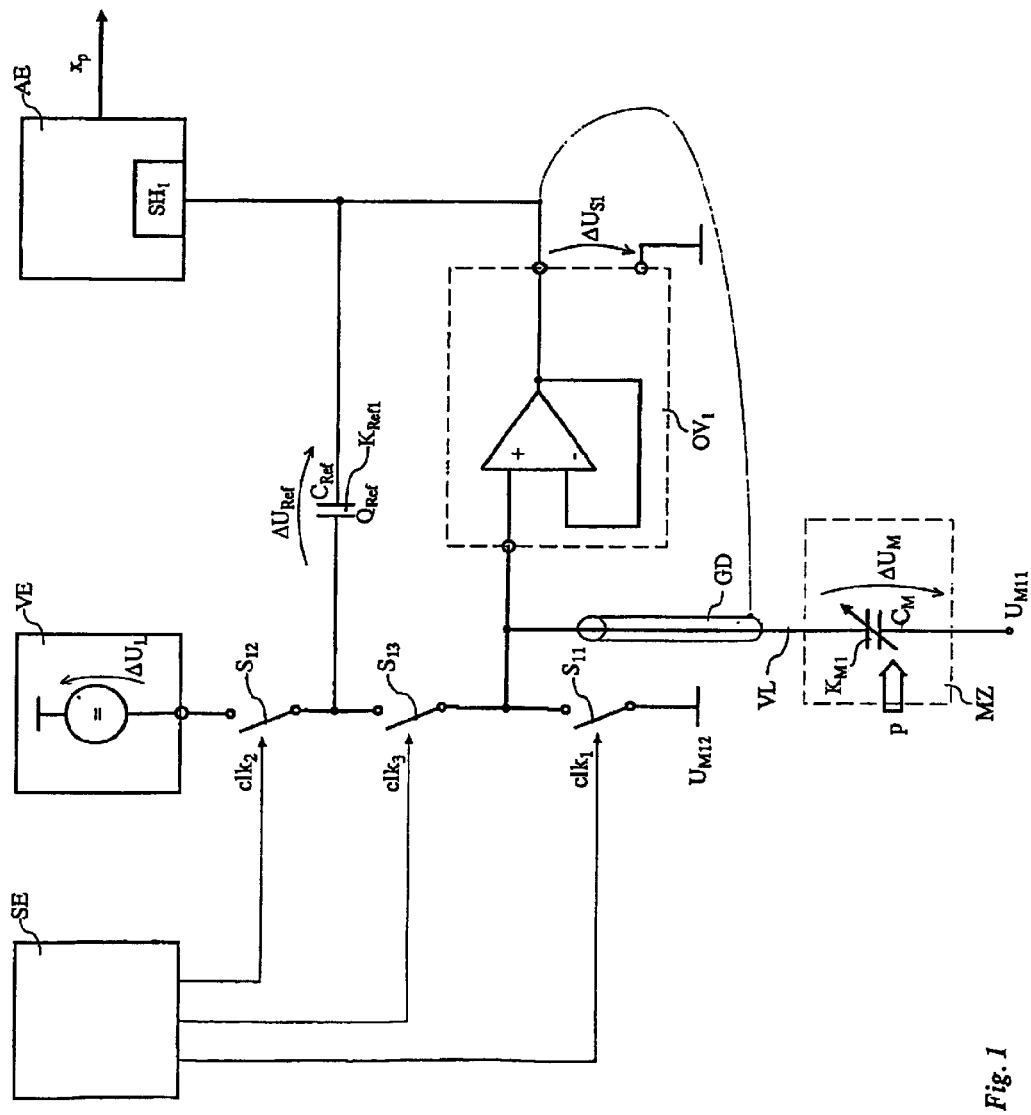
FIG. 1 shows schematically a circuit configuration for a capacitive sensor.

According to a first preferred development of the invention, the circuit configuration includes, for discharging the first measuring capacitor, a first switch, which places a first electrode of the first measuring capacitor temporarily at a first reference potential.

According to a second preferred development of the invention, a second electrode of the first measuring capacitor is at a fixed, second reference potential.

According to a third preferred development of the invention, the two reference potentials are equal for the first measuring capacitor, so that its residual charge is essentially equal to zero.

According to a fourth preferred development of the invention, the first reference capacitor is coupled with a first electrode to the output of the first buffer amplifier and, for charging of the first reference capacitor with the reference charge, a second switch is provided, which couples the first reference capacitor via a second electrode temporarily to an output of a supply electronics supplying the charging voltage.

According to a fifth preferred development of the invention, the circuit configuration includes for transferring the reference charge onto the first measuring capacitor a third switch temporarily coupling the second electrode of the first reference capacitor to the input of the first buffer amplifier.

According to a sixth preferred development of the invention, the circuit configuration includes a sample-hold circuit for sampling and holding the signal voltage.

According to a seventh preferred development of the invention, the circuit configuration additionally contains a second measuring capacitor and the input of the first buffer amplifier is temporarily coupled with the second measuring capacitor such that the output of the buffer amplifier delivers a signal voltage, which is essentially proportional to a measurement voltage occurring on the second measuring capacitor.

According to an eighth preferred development of the invention, the circuit configuration further includes:
- a second reference capacitor carrying a reference charge and
- a second buffer amplifier
  of which an input is coupled at least temporarily with the first measuring capacitor such that
  an output of the second buffer amplifier delivers a second signal voltage, which is essentially proportional to the measurement voltage occurring on the first measuring capacitor,
  wherein input and output of the second buffer amplifier are temporarily coupled together in operation via the second reference capacitor such that the reference charge is transferred as completely as possible from the second reference capacitor onto the first measuring capacitor.

According to a ninth preferred development of the invention, the circuit configuration further includes a reactive stage having a capacitance, which is as close as possible to a parasitic capacitance that partially appropriates the reference charge delivered from the first reference capacitor.

According to a tenth preferred development of the invention, the circuit configuration includes a conductor connecting the first measuring capacitor with the input of the first buffer amplifier, wherein the conductor has an actively protecting shield.

According to a first preferred development of the method of the invention, the signal voltage is sampled and temporarily held for producing a measurement signal reacting to the change in the measured quantity.

According to a second preferred development of the method of the invention, a charging voltage is applied to the reference capacitor for producing the reference charge, the application being for a sufficiently long time to cause a predetermined reference voltage drop across the reference capacitor.

According to a third preferred development of the method of the invention, the residual charge, to which the measuring capacitor is discharged, is about equal to zero.

FIG. 1 shows schematically a circuit configuration for a capacitive sensor, particularly an absolute pressure sensor, a relative pressure sensor or a differential pressure sensor. The circuit configuration serves for delivering at an output of a first buffer amplifier $OV_1$ a clocked and cyclically updated signal voltage $\Delta U_{S1}$, which represents a capacitance $C_{M1}$, of an adjustable and/or a self-adjusting first measuring capacitor $K_{M1}$ The buffer amplifier $OV_1$ can e.g. be an impedance converter.

The signal voltage $\Delta U_{S1}$ produced by the circuit configuration is preferably changed into a corresponding, especially digital, measurement signal $x_p$ by means of an evaluation electronics AE of the sensor having the circuit configuration. Signal $x_p$ can be forwarded e.g. via a data bus to an upstream measurements station. If required, the measurement signal $x_p$ can also be an analog signal, e.g. a loop current in the range of 4 mA to 20 mA. The evaluation of such signal voltage outputs from amplifier circuits is basically known to those skilled in the art and, consequently, requires no further explanation. Corresponding embodiments for a circuit suitable as evaluation electronics AE are e.g. also available in the above-mentioned EP-A 922 962.

In the operation of the circuit configuration, the capacitance of the measuring capacitor $K_{M1}$ is set by means of a variable, physical, measured quantity p, especially a static pressure, acting on the sensor, i.e. a change in the measured quantity p effects a corresponding change in the instantaneous capacitance of the measuring capacitor $K_{M1}$.

For the already indicated case, that the physical, measured quantity p to be detected by means of the sensor is a static pressure, the measuring capacitor $K_{M1}$ can e.g. be a capacitive pressure measuring cell with an elastically deformable membrane, which carries one of at least two capacitor plates and which, reacting to a change of the measured quantity with a change in flexure, adjusts a relative separation between the first and second capacitor plates. Structure and use of such pressure sensitive measuring capacitors are known per se to those skilled in the art, so that it is not necessary to consider such in more detail here. For examples of embodiments of such measuring capacitors, reference is made to U.S. Pat. No. 5,001,595, U.S. Pat. No. 5,005,421, U.S. Pat. No. 5,050,034, U.S. Pat. No. 5,079,953, U.S. Pat. No. 5,194,697, U.S. Pat. No. 5,400,489, U.S. Pat. No. 5,539,611. Of course, measuring capacitor $K_{M1}$ can, if required, also be one that reacts with a measurable change of its capacitance to changes of other physical, measured quantities, such as e.g. a temperature and/or a dielectric constant.

As shown in FIG. 1, the measuring capacitor has a first electrode at an, especially fixed, first reference potential $U_{M11}$, e.g. ground. Additionally, a second electrode of the measuring capacitor $K_{M1}$ is coupled to an input of the buffer amplifier $OV_1$. In this way, a measurement voltage $\Delta U_{M1}$, as influenced by an instantaneous charge and the instantaneous capacitance $C_{M1}$ of the measuring capacitor $K_{M1}$, is sampled practically directly by means of the buffer amplifier $OV_1$ at its input side.

According to the invention, the measuring capacitor $K_{M1}$ is discharged at the beginning of a measuring cycle to a defined residual charge $Q_{Res1}$. For this purpose, a second reference potential $U_{M12}$ is temporarily placed on the second electrode of the measuring capacitor $K_{M1}$ during operation of the circuit configuration. A corresponding residual voltage, $\Delta U_{M1,0}$, of the measuring capacitor $K_{M1}$ is thus given by:

$$\Delta U_{M1,0} = \frac{Q_{Res1}}{C_{M1}}. \tag{1}$$

Preferably for discharging the measuring capacitor $K_{M1}$, the circuit configuration is provided, in parallel with capacitor $K_{M1}$, with a first switch $S_{11}$, which, under control by a first, binary clock signal $clk_1$, serves for repeatedly, temporarily, and in predetermined manner, placing the second electrode of the measuring capacitor $K_{M1}$ at the second reference potential $U_{M12}$.

The reference potential $U_{M12}$ is preferably identical to the reference potential $U_{M11}$, so that the measuring capacitor $K_{M1}$ in this case is, in effect, short-circuited during discharging. In this way, it can be assured in simple manner that the measuring capacitor $K_{M1}$ is down to the predetermined residual charge $Q_{Res1}$, here practically equal to zero, even already after a very short discharge time. In case required, the two reference potentials can, however, be selected to be different from one another.

Besides the measuring capacitor $K_{M1}$, the circuit configuration includes additionally at least one first reference capacitor $K_{Ref1}$ of predetermined, especially discretely adjustable, capacitance $C_{Ref1}$, of which a first electrode is held at an instantaneously definite potential by the signal voltage $\Delta U_{S1}$. For this purpose, the reference capacitor $K_{Ref1}$ is connected, especially fixedly, via its first electrode, as shown in FIG. 1, with the output of the buffer amplifier $OV_1$. It is noted here, additionally, that also the signal voltage $\Delta U_{S1}$ is preferably to be referenced to the second reference potential $U_{M12}$ serving practically as the circuit null point.

In operation, the second electrode of the reference capacitor $K_{Ref1}$ is connected at times with a charging voltage $\Delta U_L$ of a supply electronics VE such that a reference voltage $\Delta U_{Ref1}$ is set on the reference capacitor $K_{Ref1}$. This reference voltage is essentially equal to an instantaneous difference, $\Delta U_L - \Delta U_{S1}$, between the charging voltage and the signal voltage. Accordingly, the reference capacitor $K_{Ref1}$ has a corresponding reference charge $Q_{Ref1}$, whose level is given essentially by the product $C_{Ref1} \times \Delta U_{Ref1}$. The charging voltage $\Delta U_L$ is here preferably referenced to the second reference potential $U_{M12}$, like the residual voltage of the measuring capacitor $K_{M1}$.

For the temporary application of the charging voltage $\Delta U_L$ on the reference capacitor $K_{Ref1}$, the circuit configuration includes preferably a second switch $S_{12}$ coupling the reference capacitor and the supply electronics VE together. Switch $S_{12}$ is controlled by a second binary clock signal clk2, especially one in phase with the clock signal $clk_1$. Clock signals $clk_1$, $clk_2$ are here so formed, that, in operation of the circuit configuration, the two switches $S_{11}$, $S_{12}$ are opened before the beginning $t_1$ of a first phase $t_1$–$t_2$.

For determining the capacity $C_{M1}$ according to the method of the invention, the measuring capacitor $K_{M1}$ is discharged as completely as possible during the phase $t_1$–$t_2$ via the switch $S_{11}$, which is closed then at least for a time, down to the predetermined residual voltage $\Delta U_{M1,0}$. Practically simultaneously with the discharging of the measuring capacitor $K_{M1}$, the reference capacitor $K_{Ref1}$ is charged by means of the charging voltage $\Delta U_L$, which is supplied then via the closed switch $S_{12}$. In case required, the discharge of the measuring capacitor $K_{M1}$ and the charging of the reference capacitor $K_{Ref1}$ can, however, also be displaced in time in the phase $t_1$–$t_2$. At the phase end $t_2$ of the phase $t_1$–$t_2$, then both the switch $S_{11}$ and the switch $S_{12}$ are again opened.

The length of the phase $t_1$–$t_2$ is selected here such that at the latest at the phase end $t_2$ the measuring capacitor is discharged to the defined residual charge, e.g. $Q_{Res1}=0$. Additionally, also at the latest at the phase end $t_2$, the reference capacitor $K_{Ref1}$ is to carry, as already mentioned, the reference charge, $$Q_{Ref1} = C_{Ref1}(\Delta U_L - \Delta U_{S1}) \tag{2}$$

After the expiration of the phase $t_1$–$t_2$, the reference charge $Q_{Ref1}$ is, during a second phase $t_3$–$t_4$ of the method of the invention, removed as much as possible from the reference capacitor $K_{Ref1}$ and transferred as much as possible onto the measuring capacitor $K_{M1}$, such that, at a phase end $t_4$ of the phase $t_3$–$t_4$, the following relationship holds for practical purposes:

$$C_{M1}(\Delta U_{M1} + \Delta U_{M1,0}) = Q_{Ref1} + Q_{Res1} \tag{3}$$

On the basis of Equations (1) and (2), Equation (3) now leads to the following expression for the measurement voltage $\Delta U_{M1}$:

$$\Delta U_{M1} = \frac{C_{Ref1}}{C_{M1}} \Delta U_{Ref1}. \tag{4}$$

As can be seen from Equation (4), the measurement voltage $\Delta U_{M1}$ in the circuit configuration of the invention is practically proportional to the reciprocal of the capacitance $C_{M1}$ of the measuring capacitor $K_{M1}$ This, in turn, has the advantage, that use of the circuit configuration of the invention in a capacitive pressure sensor, in which the capacitance $C_{M1}$ is known to depend on a reciprocal of the pressure to be measured, means that a pressure increase causes, apart from relevant amplification factors, proportionately also an increase of the measurement voltage $\Delta U_{M1}$.

For transferring the reference charge QRef1 onto the measuring capacitor $K_{M1}$, the circuit configuration of FIG. 1 includes, preferably, a third switch $S_{13}$, which, turned on by a third clock signal $clk_3$ shifted in phase from the clock signals $clk_1$, $clk_2$, connects the second electrode of the reference capacitor $K_{Ref1}$ with the input of the buffer amplifier $OV_1$.

Figure 2:
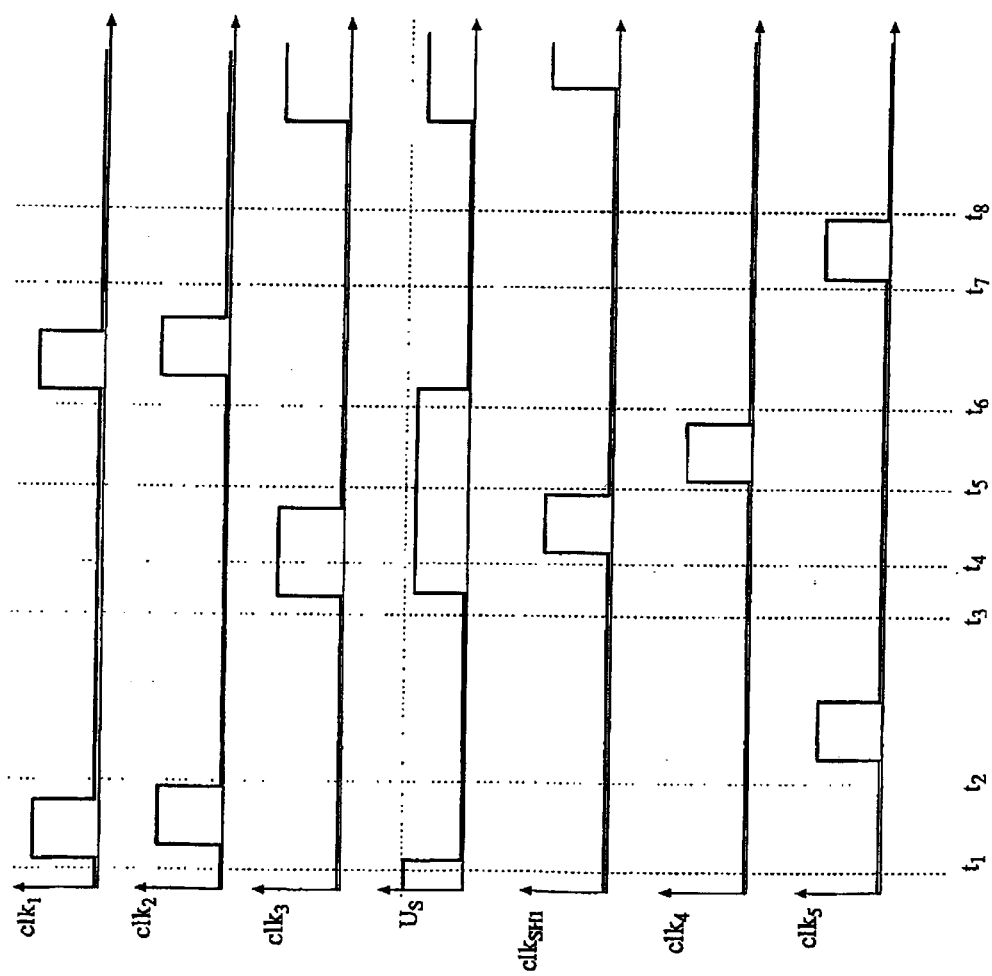
FIG. 2 shows schematically signals versus time for the circuit configuration of FIG. 1.

According to FIG. 2, the switch $S_{13}$, previously open, especially during the phase $t_1$–$t_2$, is closed during the course of phase $t_3$–$t_4$. An instantaneous signal level difference arising directly after the closing of the switch $S_{13}$ between the input and the output of the buffer amplifier $OV_1$ is practically immediately equalized thereby. Expressed in other terms, the reference voltage $\Delta U_{Ref1}$ lying across the reference capacitor $K_{Ref1}$ is set to null following the closing of switch $S_{13}$, whereby inevitably the reference capacitor $K_{Ref1}$ is also discharged. A discharge current flowing in this regard transports the reference charge previously carried by the reference capacitor $K_{Ref1}$ practically completely to the measuring capacitor $K_{M1}$.

Both the mentioned switch $S_{13}$ and also the switches $S_{11}$, $S_{12}$ can, in manner known to those skilled in the art, be realized by means of transistors, especially field-effect transistors. It should be noted at this point additionally that the switches $S_{11}$, $S_{12}$, $S_{13}$ are drawn as normally open, thus as switches that close when the associated clock signal $clk_1$, $clk_2$, $clk_3$, respectively, turns high. Should it be required, however, the switches $S_{11}$, $S_{12}$, $S_{13}$ can also be embodied as normally closed, which are each then closed, when the associated clock signal is low. Naturally, the clock signals are to be inverted in appropriate manner for this case.

As can be seen from FIG. 2, the clock signals $clk_1$, $clk_2$, $clk_3$ are, in any case, to be formed such that the switch $S_{13}$ is, at most, always only closed when the two switches $S_{11}$, $S_{12}$ are open. In case required, the clock signals have for this, as, in fact, shown in FIG. 2, different pulse-to-pause relationships from one another. For suppressing interference couplings onto the signal voltage, the clock signals can, as e.g. also described in EP-A 922 962, additionally be varied in operation with respect to their clock frequency or their phase position, while maintaining the above-described boundary conditions.

The clock signals $clk_1$, $clk_2$, $clk_3$ can e.g. be produced by an appropriate control electronics SE of the sensors having the circuit configuration.

According to a preferred further development of the method of the invention, for producing the measurement signal $x_p$, the signal voltage $\Delta U_{S1}$ is sampled and held during a third phase $t_4$–$t_5$ following the phase $t_3$–$t_4$ by a sample-hold circuit $SH_1$ controlled by a sample clock signal $clk_{SH1}$. The sample clock signal $clk_{SH1}$ is, as also shown schematically in FIG. 2, so formed that the sample-hold circuit $SH_1$ is activated only after the closing of the switch $S_{13}$ and after the updating of the signal voltage $\Delta U_{S1}$, when it is then coupled to the output of the buffer amplifier $OV_1$ carrying this. Additionally, a pulse width of the sample clock signal $clk_{SH1}$ is to be dimensioned such that the sample-hold circuit $SH_1$ is separated again from the buffer amplifier $OV_1$ at the latest at the end $t_5$ of the phase $t_4$–$t_5$.

The sample-hold circuit $SH_1$ can be followed, in manner known to those skilled in the art, with an analog-to-digital converter serving for producing a digital signal representing the signal voltage $\Delta U_{S1}$. For correcting any possible drift of the charging voltage $\Delta U_L$, the analog-to-digital converter (not shown here) is advantageously coupled with a reference input, e.g. to a reference voltage directly proportional to the charging voltage $\Delta U_L$.

Investigations have additionally shown that, in concrete realizations of the circuit configuration of the invention, the case can arise that, for practical cases, unavoidable, parasitic capacitances of the circuit configuration can be so formed and so connected that a significant fraction of the reference charge $Q_{Ref1}$, from about 1% to 10%, is not transferred onto the measuring capacitor $K_{M1}$. This, in turn, would cause a significant error in the signal voltage $\Delta U_{S1}$. Additionally, such parasitic capacitances, which e.g. can be formed by usually applied overvoltage protection circuits, by conductor capacitances or by input capacitances of the buffer amplifier $OV_1$, are most often variable, so that their influence on the signal voltage $\Delta U_{S1}$ cannot practically be predicted with accuracy ahead of time.

Therefore, for improving the accuracy of the signal voltage $\Delta U_{S1}$ according to a preferred, further development of the invention, a reactive stage $BS_1$ is provided, having a capacitance $C_{BS1}$, which, on the one hand, is as equal as possible to a parasitic capacitance $C_{PS1}$ partially appropriating the reference charge $Q_{Ref1}$, and which, on the other hand, also changes in operation in an at least similar manner. In order to achieve as accurate a mimicking of this parasitic capacitance $C_{PS1}$ as possible, the reactive stage $BS_1$ is designed essentially identically to the circuit structure PS1 forming the parasitic capacitance $C_{PS1}$.

Figure 3:
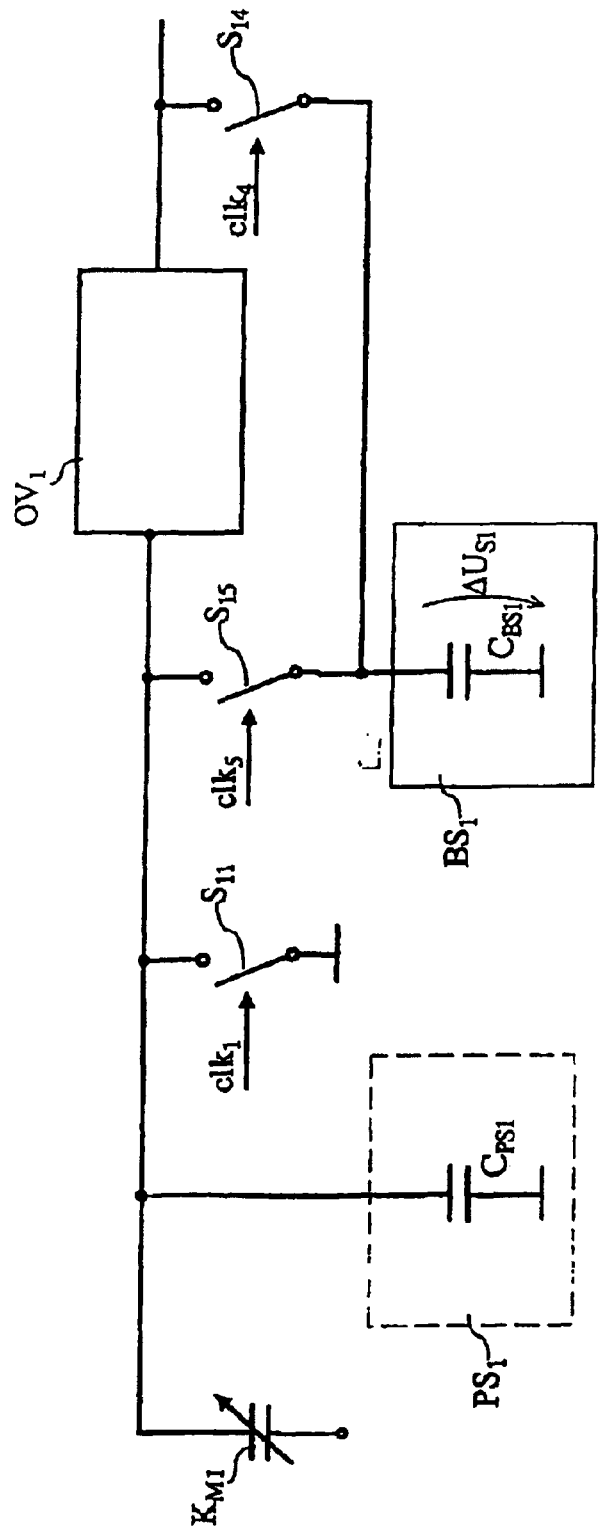
FIG. 3 shows schematically a further development of the circuit configuration of FIG. 1

For compensating the fraction of the reference charge $Q_{Ref1}$ transferred onto the circuit structures PS1, the capacitance $C_{BS1}$ of the reactive stage $BS_1$, is charged, according to a preferred, further development of the method of the invention, in a fourth phase $t_5$–$t_6$ by means of the signal voltage $\Delta U_{S1}$. For this purpose, a fourth switch $S_{14}$ is provided in the circuit configuration in the case of this further development of the invention. Switch $S_{14}$ is controlled, as shown in FIG. 3, by a fourth clock signal $clk_4$ and connects a first electrode of the reactive stage $BS_1$ with the output of the buffer amplifier $OV_1$ carrying the signal voltage $\Delta U_{S1}$.

A charge produced in this way in the reactive stage $BS_1$ is distributed by means of a fifth switch $S_{15}$ controlled by a fifth clock signal $clk_5$ finally during a fifth phase $t_7$–$t_8$ at least partially onto the measuring capacitor $K_{M1}$ discharged as described above and onto the circuit structures PS1 discharged in the same way. The phase $t_7$–$t_8$ happens, as can be seen clearly from FIG. 2, practically between the two phases $t_1$–$t_2$, $t_3$–$t_4$ of a measuring cycle following on the charging of the reactive stage $BS_1$, in phase $t_7$–$t_8$.

In this further development of the method of the invention, the following approximation can hold for the measurement voltage $\Delta U_{M1}$, provided that, as above, the parasitic capacitance $C_{PS1}$ lies in the range from about 1% to 10% of the measurement capacitance $C_{M1}$ and assuming that both the parasitic capacitance $C_{PS1}$ and the measurement capacitance $C_{M1}$ approximately do not change over a time period large in comparison to the period of a measuring cycle:

$$\Delta U_{M1} = \frac{C_{Ref1}}{C_{M1} + C_{PS1} - C_{BS1}} \Delta U_{Ref1}. \tag{5}$$

As easily understandable on the basis of Equation 5, this approximation corresponds to the case where $C_{PS1}$ is equal to $C_{BS1}$, Equation 4. The assumption made in this, that the capacitances $C_{PS1}$, $C_{M1}$, change relatively slowly during two adjoining measuring cycles, can be easily fulfilled by a correspondingly high repetition rate of the measuring cycles, thus by choosing an appropriately high frequency for the clock signals. It should also be noted at this point that this approximation is ever so more accurate, the smaller the parasitic capacitance $C_{PS1}$ is in comparison to the measurement capacitance.

It has also been found that, besides the mentioned parasitic capacitances, also interference voltages, which occur along the signal transfer path extending between the measuring capacitor $K_{M1}$ and the buffer amplifier $OV_1$, can be a further cause for possible disturbing of the signal voltage $\Delta U_{S1}$.

For the suppression of such disturbances on the signal voltage $\Delta U_{S1}$, a preferred further development of the invention provides between the first electrode of the measuring capacitor $K_{M1}$ and the input of the buffer amplifier $OV_1$ a conductor VL, which is at least sectionally shielded. In order to prevent a distortion of the signal voltage $\Delta U_{S1}$ because of usually not constant, conductor capacitances additionally introduced into the signal transmission path by this conductor VL, this further development additionally includes a galvanic connection between a shield GD, especially a coaxial shield, of the conductor VL and the output of the buffer amplifier $OV_1$. This known measure, also known as active guarding or "accompanying shield", serves for discharging as much as possible a conductor capacitance formed between the first electrode of the measuring capacitor $K_{M1}$ and the shield GD, or at least to maintain a constant charge therein, to the extent possible.

Figure 4:
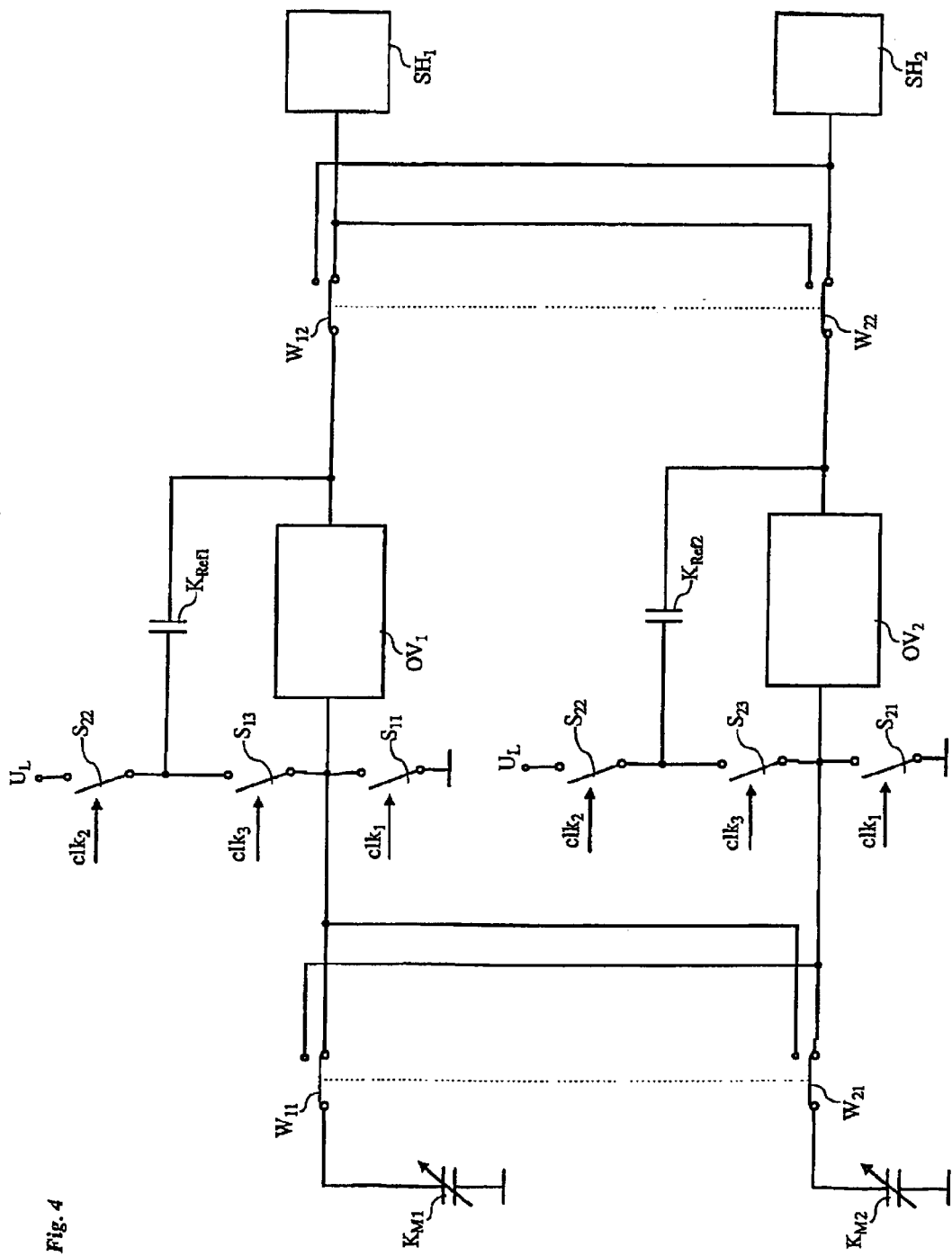
FIG. 4 shows schematically another further development of the circuit configuration of FIG. 1.

For the case where, as is usual e.g. in the measurement of pressure differences, a capacitance CM2 of a second measuring capacitor $K_{M2}$ is to be registered in parallel with the measurement of the capacitance $C_{M1}$ of the measuring capacitor $K_{M1}$, at least a second measured value acquisition stage practically identical to the above-described first measured value acquisition stage can be used. Thus, whereas the first stage contains at least the measuring capacitor $K_{M1}$, the reference capacitor $K_{Ref1}$, the buffer amplifier $OV_1$ and the switches $S_{11}$, $S_{12}$, $S_{13}$, the second stage contains at least a second measuring capacitor $K_{M2}$, a second reference capacitor $K_{Ref2}$, a second buffer amplifier $OV_2$ and a sixth, seventh and eighth switch $S_{21}$, $S_{22}$, $S_{23}$. At the output of the buffer amplifier $OV_2$, a second signal voltage $\Delta U_{S2}$ can be sampled, which represents a measurement voltage drop $\Delta U_{M2}$ across the measuring capacitor $K_{M2}$. The corresponding clock signals $clk_1$, $clk_2$, $clk_3$ can serve e.g. for controlling the switches $S_{21}$, $S_{22}$, $S_{23}$. See FIG. 4.

Preferably, the evaluation electronics AE in this further development of the invention includes also a second sample-hold circuit $SH_2$ for the signal voltage $\Delta U_{S2}$ delivered from the second measured value acquisition stage.

It has additionally been found with this further development of the invention that, especially for the case where the two measured value acquisition stages have different transfer behaviors from one another, caused e.g. by small tolerance variations in the individual components, a cyclic exchanging of the individual, identically acting components of the measured value acquisition stages, thus e.g. of both buffer amplifiers $OV_1$, $OV_2$ and/or both reference capacitors $K_{Ref1}$, $K_{Ref2}$ and/or, in some cases, both sample-hold circuits $SH_1$, $SH_2$ delivers, on average, the most accurate measurement results. The exchanging of individual components can e.g. occur by means of a simple switching mechanism composed of a first, second, third and fourth change-over switch $W_{11}$, $W_{12}$, $W_{21}$ and $W_{22}$, which switches (after some, e.g. about 10 to 100, repetitions of the above-described measuring cycles encompassing at least the phases $t_1$–$t_2$, $t_3$–$t_4$) are moved as synchronously as possible out of the shown switch positions into the respective alternate positions, and vice versa.

The first measured value acquisition stage of the proposed circuit configuration and, if present, also the second measured value acquisition stage and/or the reactive stage $BS_1$ are preferably realized in a monolithic structural form, e.g. integrated into a single ASIC component. This has, besides a very small space requirement for the circuit configuration, e.g. also the advantage that also the second measured value acquisition stage can be manufactured very simple as an identical duplicate of the first measured value acquisition stage. Likewise, also the reactive stage $BS_1$ can, in this way, be matched very easily to the switching structures PS1 forming the parasitic capacitance.

What is claimed is:

1. A circuit configuration for a capacitive sensor, which configuration comprises:
   a first measuring capacitor ($K_{M1}$) of variable capacitance discharged to a predeterminable residual charge and having a variable capacitance, which is set by means of a physical, measured quantity (p) to be detected,
   a first reference capacitor ($K_{Ref1}$) carrying a reference charge, and
   a first buffer amplifier ($OV_1$),
   of which an input is coupled at least temporarily with the first measuring capacitor ($K_{M1}$) such that
   an output of the first buffer amplifier ($OV_1$) delivers a first signal voltage, which is essentially proportional to a measured voltage occurring on the first measuring capacitor ($K_{M1}$),
   wherein input and output of the first buffer amplifier ($OV_1$) are coupled during operation temporarily together via the first reference capacitor ($K_{Ref1}$) such that the reference charge of the first reference capacitor ($K_{Ref1}$) is transferred as completely as possible onto the first measuring capacitor ($K_{M1}$).

2. Circuit configuration as claimed in claim 1, further comprising, for discharging the first measuring capacitor ($K_{M1}$), a first switch ($S_{11}$), which places a first electrode of the first measuring capacitor ($K_{M1}$) temporarily at a first reference potential.

3. Circuit configuration as claimed in claim 2, wherein a second electrode of the first measuring capacitor ($K_{M1}$) is at a fixed, second reference potential.

4. Circuit configuration as claimed in claim 3, wherein the two reference potentials are equal for the first meeting capacitor ($K_{M1}$), so that its residual charge is essentially equal to zero.

5. Circuit configuration as claimed in claim 1,
   wherein the first reference capacitor ($K_{Ref1}$) is coupled with a first electrode to the output of the first buffer amplifier ($OV_1$) and
   wherein, for charging the first reference capacitor ($K_{Ref1}$) with the reference charge, a second switch ($S_{12}$) is provided, which couples the first reference capacitor ($K_{Ref1}$) via a second electrode temporarily to an output of a supply electronics (VE) supplying the charging voltage.

6. Circuit configuration as claimed in claim 1, further comprising, for transferring the reference charge onto the first measuring capacitor ($K_{M1}$), a third switch ($S_{13}$) temporarily coupling the second electrode of the first reference capacitor ($K_{Ref1}$) to the input of the first buffer amplifier ($OV_1$).

7. Circuit configuration as claimed in claim 1, further comprising a sample-hold circuit ($SH_1$) for sampling and holding the signal voltage.

8. Circuit configuration as claimed in claim 1,
   wherein a second measuring capacitor ($K_{M2}$) is provided and
   wherein the input of the first buffer amplifier ($OV_1$) is temporarily coupled with the second measuring capacitor ($K_{M1}$) such that the output of the buffer amplifier ($OV_1$) delivers a signal voltage, which is essentially proportional to a measurement voltage occurring on the second measuring capacitor ($K_{M1}$).

9. Circuit configuration as claimed in claim 8, further comprising:
   a second reference capacitor ($K_{Ref2}$) carrying a reference charge and
   a second buffer amplifier ($OV_2$)
   of which an input is coupled at least temporarily with the first measuring capacitor ($K_{M1}$) such that
   an output of the second buffer amplifier ($OV_2$) delivers a second signal voltage, which is essentially proportional to the measurement voltage occurring on the first measuring capacitor ($K_{M1}$),
   wherein input and output of the second buffer amplifier (OV2) are temporarily coupled together in operation via the second reference capacitor ($K_{Ref2}$) such that the reference charge is transferred as completely as possible from the second reference capacitor ($K_{Ref2}$) onto the first measuring capacitor ($K_{M1}$).

10. Circuit configuration as claimed in claim 1, further comprising a reactive stage ($BS_1$) having a capacitance, which is as close as possible to a parasitic capacitance that partially appropriates the reference charge delivered from the first reference capacitor ($K_{Ref1}$).

11. Circuit configuration as claimed in claim 1, wherein a conductor (VL) connecting the first measuring capacitor ($K_{M1}$) with the input of the first buffer amplifier ($OV_1$) has an actively protecting shield (GD).

12. Sensor with a circuit configuration as claimed in claim 1.

13. Method for setting a signal voltage, which represents instantaneously a variable, physical, measured quantity (p), especially a static pressure of a fluid, which method comprises the following steps:
   causing a change in the capacitance of an adjustable measuring capacitor ($K_{M1}$), such change corresponding with a change in the measured quantity (p);
   discharging the measuring capacitor ($K_{M1}$) to a predetermined residual charge,
   producing a reference charge on a reference capacitor ($K_{Ref1}$),
   transferring the reference charge from the reference capacitor ($K_{Ref1}$) onto the measuring capacitor ($K_{M1}$) for producing a measurement voltage instantaneously representing its capacity, and
   amplifying the measurement voltage with an amplification of about one for producing the signal voltage.

14. Method as claimed in claim 13, wherein the signal voltage is sampled and temporarily held for producing a measurement signal ($x_p$) reacting to the change in the measured quantity (p).

15. Method as claimed in claim 13, wherein a charging voltage is applied to the reference capacitor ($K_{Ref1}$) for producing the reference charge, the application being for a sufficiently long period of time to cause a predetermined reference voltage drop across the reference capacitor.

16. Method as claimed in claim 13, wherein the residual charge, to which the measuring capacitor ($K_{Ref1}$) is discharged, is about equal to zero.

* * * * *